United States Patent
Grosfeld et al.

(10) Patent No.: US 6,897,852 B2
(45) Date of Patent: May 24, 2005

(54) INFORMATION INPUT DISPLAY DEVICE

(75) Inventors: Henry Grosfeld, Great Neck, NY (US);
Joanne Calamari, Lynbrook, NY (US);
Robert Kowalski, Commack, NY (US);
Tatsuyuki Uemura, Tokyo (JP);
Toshimasa Akagi, Tokyo (JP);
Hidenobu Mochinushi, Tokyo (JP);
Takashi Suzuki, Tokyo (JP); Tokuo
Shimizu, Tokyo (JP)

(73) Assignee: Symbol Technologies, Inc., Holtsville, NY (US)

( * ) Notice: Subject to any disclaimer, the term of this patent is extended or adjusted under 35 U.S.C. 154(b) by 199 days.

(21) Appl. No.: 10/108,651

(22) Filed: Mar. 28, 2002

(65) Prior Publication Data
US 2003/0184514 A1 Oct. 2, 2003

(51) Int. Cl.⁷ ................................................ G09G 3/36
(52) U.S. Cl. ...................................... 345/173; 345/156
(58) Field of Search ................................ 345/156, 173, 345/174, 175, 176, 177, 178; 349/1, 2; 277/590

(56) References Cited

U.S. PATENT DOCUMENTS 6,088,069 A * 7/2000 Farlow ........................ 349/12
6,310,612 B1 * 10/2001 Kotsubo et al. ............. 345/173
6,456,279 B1 * 9/2002 Kubo et al. .................. 345/173
6,556,189 B1 * 4/2003 Takahata et al. ............. 345/173
2002/0130849 A1 * 9/2002 Ahn et al. .................... 345/173
2002/0149571 A1 * 10/2002 Roberts ....................... 345/174

* cited by examiner

Primary Examiner—Nay Maung
Assistant Examiner—Shaima Q. Aminzay
(74) Attorney, Agent, or Firm—Amin & Turocy, LLP

(57) ABSTRACT

There has been a problem with a film provided on a surface of an input section such as a touch panel etc., which is arranged on a display such as a conventional type of liquid crystal display or the like is swelled or corrugated owing to deterioration with the lapse of time, or change in temperature and humidity.

According to the present invention, there is provided an information input display device. The device comprises a drawing action section which generates tension to draw outward directly or indirectly by elasticity in a film, when an input section capable of displaying in a transmittable manner, which is arranged on a surface of a display section, is attached to an housing. The device prevents swelling or corrugation of the film from occurring by the tension.

10 Claims, 5 Drawing Sheets

INFORMATION INPUT DISPLAY DEVICE

BACKGROUND OF THE INVENTION

1. Field of the Invention

The present invention relates to the improvement in an information input display device, which comprises a display mounted on an information terminal represented by a portable telephone or PDA (personal digital assistant) and an input section disposed on the display.

2. Description of the Related Art

An information terminal having a liquid crystal display for displaying information are generally known. On the liquid crystal display, there is provided a device mounted with a touch panel serving as an input section. Through the input section, instructions to select display items, or input of characters, numerals, etc. can be carried out by touching the touch panel so as to put pressure thereon.

The touch panel generally has a structure as shown in FIG. 9. In the touch panel 1, a conductive layer 102 is formed on a glass substrate 101 (or a plastic substrate) by using a technique of forming layer such as a vapor deposition method, and wiring 103 made of material having low resistivity such as silver (Ag) etc. is formed on the conductive layer 102. The glass substrate 101 with insulating properties is transparent or capable of display in a transmittable manner. Separately from the above, coating layers 105 are formed on both surfaces of a film 104 so as to make the film 104 durable. The film 104 is made of a PET (polyethylene terephthalate) sheet etc. and transparent or capable of display in a transmittable manner. A conductive layer 106 is formed on one of the coating layers 105.

A surface of the glass substrate 101 on which conductive layer 102 is formed and a surface of the film 104 on which the conductive layer 106 is formed are opposed to each other, and both peripheral end portions of the above surfaces are bonded together with a space of about 0.1 mm interposed therebetween with an adhesive 107 such as a adhesives double sided tape etc. In such a structure, by putting pressure on the film 104 from above, the conductive layer 106 is brought into contact with the conductive layer 102, thereby input can be carried out.

Being manufactured for portable use, this information terminal is miniaturized and lightened. Therefore, a user can carry the terminal in bag or a pocket. Naturally enough, the information terminal may be dropped mistakenly while the user is carrying it with him or her, or holding it in his or her hand. So, measures to relieve impact caused by being dropped have been taken to the terminal, so as to prevent it from being damaged. With respect to the display section including the touch panel, an elastic member such as rubber etc. surrounds an edge of the display section to protect the display from an impact and from water damage. In addition, preventive measures against damage caused by static electricity are also taken. For example, as such a structure, the present applicant has disclosed a constitution as shown in FIG. 10 to realize the moderation of impact and waterproofing.

FIG. 10 is a cross-section view of a device, wherein a touch panel 109 is superposed with a liquid crystal display (not shown), and a gasket 108 with a hook-shaped cross-section, which has elasticity and thus can be a buffer, is fitted in a manner of surrounding an edge of the superposed touch panel 109 and liquid crystal display around. The superposed touch panel 109 and liquid crystal display is fixed by means of a metal frame (not shown) so as to support and press the gasket 108 against a housing 110. In such a structure, as shown in FIG. 10, an end portion of the gasket 108, which comes into contact with the touch panel 109, is formed into a ring shape. When the gasket 108 is pressed by the metal frame (not shown), the end portion of the gasket 108 is crushed between a surface of the touch panel 109 and an inner surface of the housing 110. Thus, the touch panel 109 can be held and fixed with proper force, while having a waterproof function.

In the aforementioned touch panel, a case may occur in that the film 104 constituting a surface of the panel is swelled or corrugated owing to deterioration with lapse of time, temperature or humidity. In the touch panel, the almost entire periphery of the film 104 is bonded to the glass substrate 101 with the adhesive 107 so that the film 104 is fixed. There is a difference in the coefficient of thermal expansion or elongation caused by moisture absorption between the film 104 and the glass substrate 101. Therefore, the swell or corrugation may occur easily owing to the influence of heat or humidity, or deformation of the adhesive 107 owing to heat.

In the case where the film 104 is swelled or corrugated as having previously been described, a problem arises in that: even if input operation is performed by signing with light force, the operation can not be carried out properly; or input operation can not be performed because of a short-circuit between the conductive layer 106 of the film 104 and the conductive layer 102 on the glass substrate 101. In addition, when the distance between the film 104 and the glass substrate 101 becomes considerably short, another problem thus arises in that Newton ring occurs so that it becomes difficult to see information displayed on the panel.

This touch panel is seldom used alone. In general, the touch panel is disposed on a display screen and incorporated in a device for use. If the aforementioned information terminal mounted with the touch panel is for industrial use, the touch panel is to be used under severe conditions (for example, the operation environment is in the range of −20 to 50° C., the storage environment is in the range of −40 to 70° C.). For this reason, it is required for the touch panel to have excellent durability.

A touch panel (information input device) to be mounted on an information terminal shown in FIG. 10 is fixed through the gasket 108 so as to provide protection from impact and water. In a structure in which the gasket 108 surrounds the touch panel 109 as shown in FIG. 10, assume that the film 104 of the touch panel 109 elongates owing to high temperature or moisture absorption. In this case, even if the temperature or humidity has fallen and thus a portion of the film, which is drawn to the inner side from the point where the gasket holds the film down, is intended to revert to its former state, it cannot be achieved owing to the pressure from the gasket. The portion remains on the display screen so that swelling or corrugation may occur.

In addition to such a phenomenon, assume a state in which the touch panel moves in assembly to the housing 110 or after shipment, and the gasket 108 holds an end portion of the touch panel 109 as shown in FIG. 11. In such a state, the force (denoted by a reference character Fe in FIG. 11) to intend the film 104 to move to the inner side occurs, and thus an adhered portion is displaced to the inner side. Therefore, the film is swelled or corrugated. In addition, as the degree of crushing an end portion of the gasket 108 is increased so as to hold the film 104 harder for the purpose to waterproof the device or prevent the touch panel 109 from being moved, swelling or corrugation appears remarkably and easily. When the swelling or corrugation occurs of the film, a problem similar to ones described above arises.

BRIEF SUMMARY OF THE INVENTION

An object of the present invention is to provide an information input display device, which has a mechanism to perform a process of suppressing the occurrence of swelling or corrugation of a film of an input section disposed on a display such as a liquid crystal display etc.

To achieve the above-described object, according to a first aspect of the invention, there is provided an information input display device, comprising:

a display section to indicate information;

an input section arranged on a surface of the display section and capable of displaying the information in a transmittable manner; and a casing to contain the display section and the input section, wherein the input section comprises: a base material capable of displaying in a transmittable manner; a film capable of displaying in a transmittable manner; and an adhesives to adhere a surrounding portion of the film to the base material on which the film is superposed, and the casing has a drawing action section to apply tension to the film directly or indirectly.

In addition, according to a second aspect of the invention, there is provided an information input display device, comprising:

a display section to indicate information;

an input section arranged on a surface of the display section and capable of displaying the information in a transmittable manner;

a casing to contain the display section and the input section;

an elastic member to surrounds the entire side portion of the input section and the display section; and a frame member to protect the surround of the display section and the input section through the elastic member and support the display section and the input section by connecting with the casing, wherein the input section comprises a base material capable of displaying in a transmittable manner; a film capable of displaying in a transmittable manner; and an adhesives to adhere a surrounding portion of the film to the base material on which the film is superposed, and the casing has a drawing action section to apply tension to the film directly or indirectly.

In the information input display device having the above-described constitution, tension is applied to the film of the input section to draw the film outward through the drawing action section, so that swelling or corrugation can be prevented from occurring. In addition, even there is a dislocation in a positional relationship in assembling the drawing action section, the drawing action section guides to the proper position. Thus, the entire periphery of the display section can be held uniformly.

DETAILED DESCRIPTION OF THE PREFERRED EMBODIMENTS

Embodiments of the present invention will be described in detail below with reference to the accompanying drawings.

Figure 9:
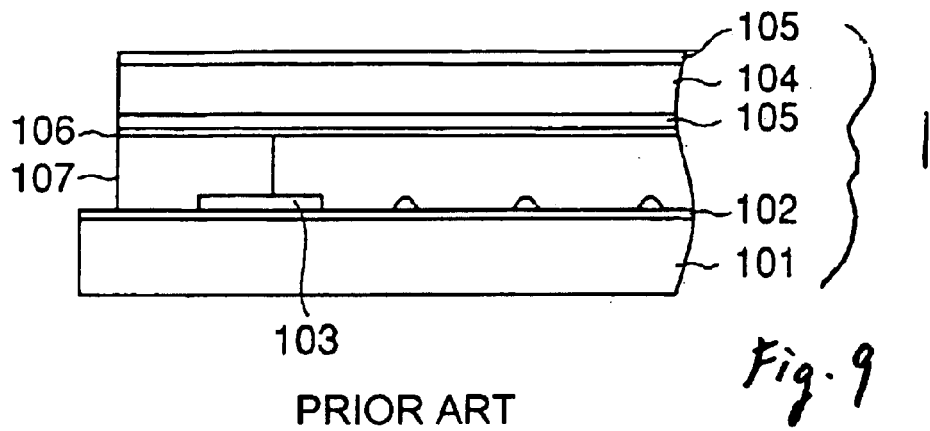
FIG. 9 is a view showing a general constitution example of a conventional touch panel.
Figure 10:
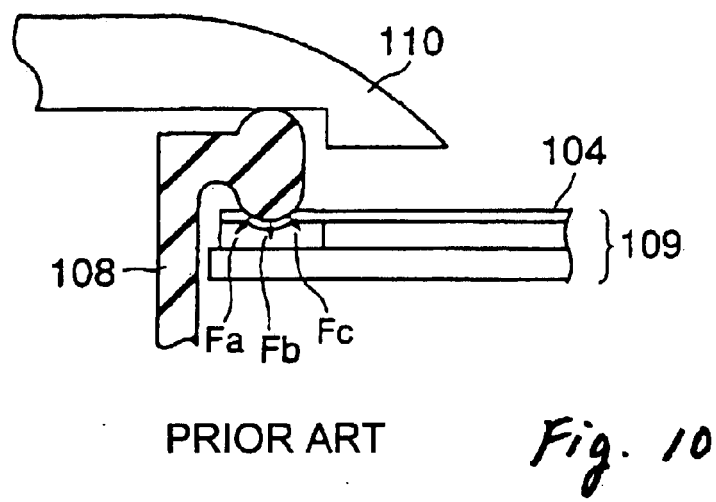
FIG. 10 is a view showing an example of an assembly mechanism including conventional functions of relieving impact and waterproofing in a touch panel to be mounted on a portable information terminal device.
Figure 11:
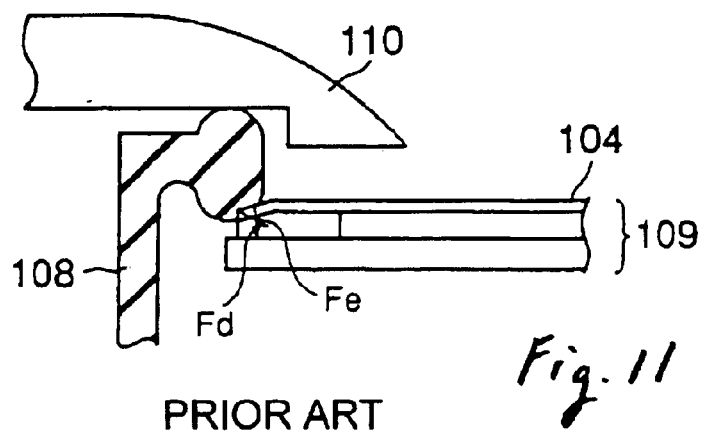
FIG. 11 is a view for explaining problems in an assembly mechanism of a conventional touch panel having functions of relieving impact and waterproofing.

A process to be explained first is an annealing process for suppressing the occurrence of swelling or corrugation in a film integrated with a touch panel. The touch panel has the aforementioned structure as shown in FIG. 9 and serves as an input section capable of displaying information in a transmittable manner. The annealing process is applied before to assembly of the touch panel into a mechanism which prevents swelling or corrugation from occurring in the film of the touch panel in each embodiment to be described later.

Figure 4A:
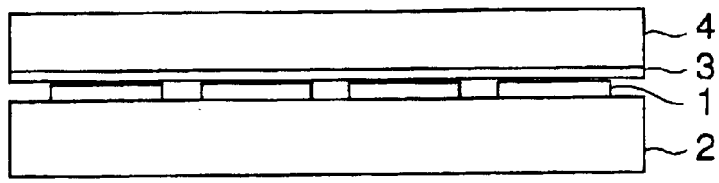
FIGS. 4A, 4B are diagrams for explaining an annealing process to a touch panel.
Figure 4B:
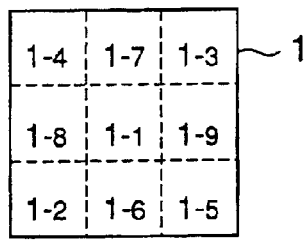

As shown in FIG. 4A, touch panels 1 are mounted on a flat glass plate 2. A flat PET sheet 3 is put on upper surfaces of the touch panels 1, and further a flat glass plate 4 serving as a weight is mounted thereon so as to put a load to the respective touch panels 1 equally. In this embodiment, a load of about 240 g is put on each of the touch panels, for example. Then, the annealing process is applied at 120° C. in the atmosphere and for the duration of 45 minutes. The annealing process is applied using a heater or a heating lamp.

An effect of preventing swelling or corrugation in the film of the touch panels 1 whereto the annealing process described above is applied will be explained.

Prepare a touch panel to which the annealing process is applied and another touch panel to which the annealing process is not applied, and the degree of swelling in each of the touch panels is measured. Next, acceleration tests are carried out so as to observe how the degrees of swelling in both of the touch panels change with the lapse of time. The acceleration tests are conducted such that the touch panels are left under the state of high temperature and high humidity such as the temperature of 70° C. and relative humidity of 85%, for twelve hours, for example. Table 1 shows the measurement results of the acceleration tests carried out under the above described state to the both touch panels, one to which the annealing process is applied and the other one to which the annealing process is not applied.

TABLE 1

| | Degree of sweelling (at the most swelled part) | | | | |
|---|---|---|---|---|---|
| Sample No. | 1 | 2 | 3 | 4 | Average |
| Touch Panel Annealed | | | | | |
| Before the acceleration test | 0.097 mm | 0.101 mm | 0.09 mm | 0.095 mm | 0.096 mm |
| After the acceleration test | 0.088 mm | 0.086 mm | 0.099 mm | 0.085 mm | 0.09 mm |
| Change in swelling degree | 0.91% | 0.85% | 1.10% | 0.89% | 0.93% |
| Touch Panel not Annealed | | | | | |
| Before the acceleration test | 0.111 mm | 0.144 mm | 0.093 mm | 0.125 mm | 0.118 mm |
| After the acceleration test | 0.474 mm | 0.545 mm | 0.273 mm | 0.527 mm | 0.455 mm |
| Change in swelling degree | 4.27% | 3.78% | 2.94% | 4.22% | 3.85% |

According to the measurement results, with respect to the touch panel whereto the annealing process is applied, values before and after the acceleration test are almost the same, so that it can be find that no swelling occurs in the touch panel itself. On the other hand, with respect to the touch panel whereto the annealing process is not applied, the degree of swelling increased four point three times as much as its initial condition at the maximum, and three point nine times as much as it was on average.

It is obvious that factors in occurrence of swelling or corrugation, which the touch panel originally has, can be suppressed by applying the annealing process.

Figure 1:
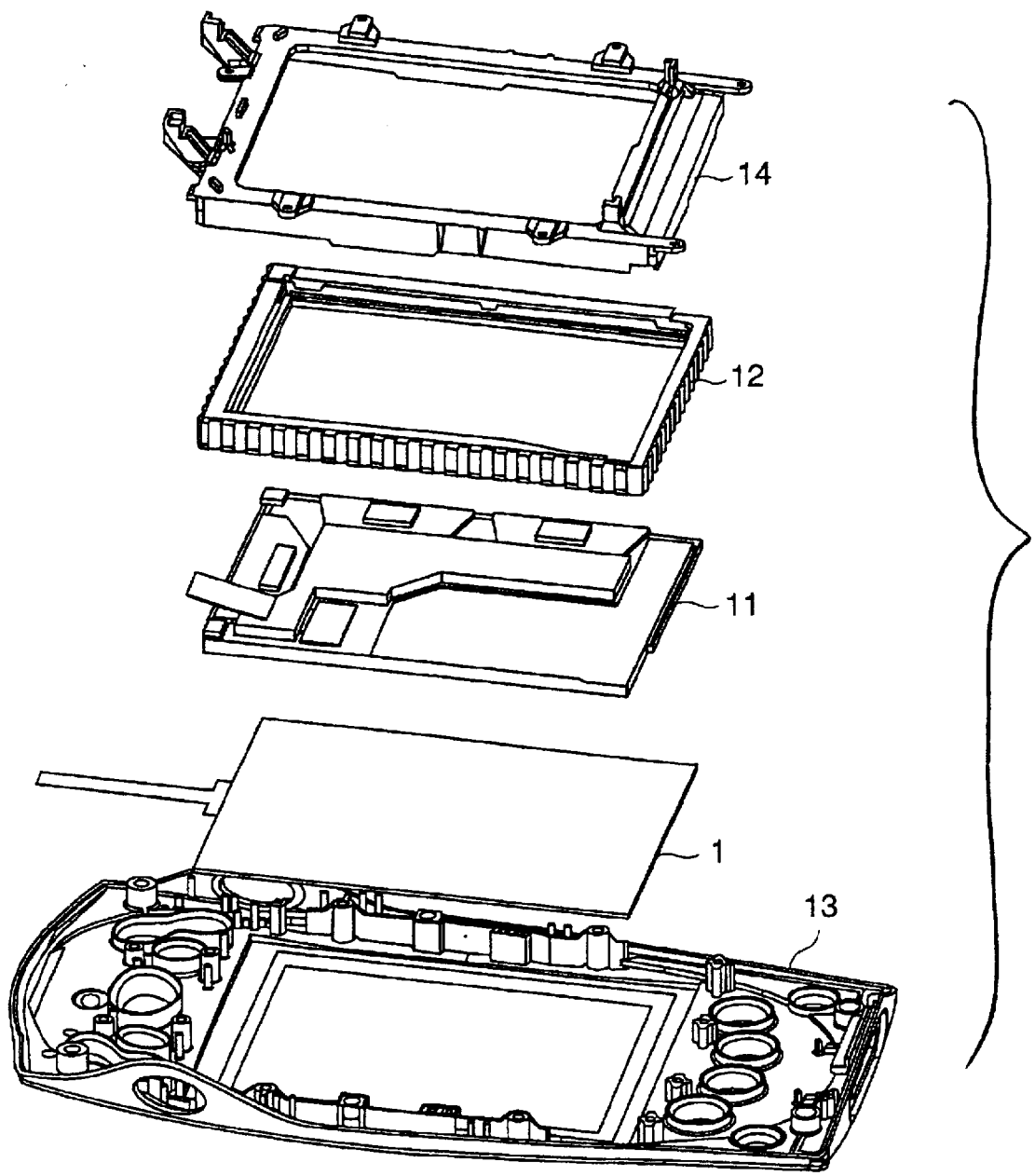
FIG. 1 is a view showing a constitution example of assembly in mounting a touch panel on an information terminal device.

Next, as a first embodiment, a mechanism to prevent the occurrence of swelling or corrugation in a film of a touch panel mounted on an information terminal device will be described. FIG. 1 shows a constitution of assembly in mounting a touch panel with an annealing process applied thereto on an information terminal device. The information terminal device is designed for portable use, with a structure of preventing from being damaged by dropping, waterproof, dustproof and preventing from being damaged caused by static electricity.

Figure 2:
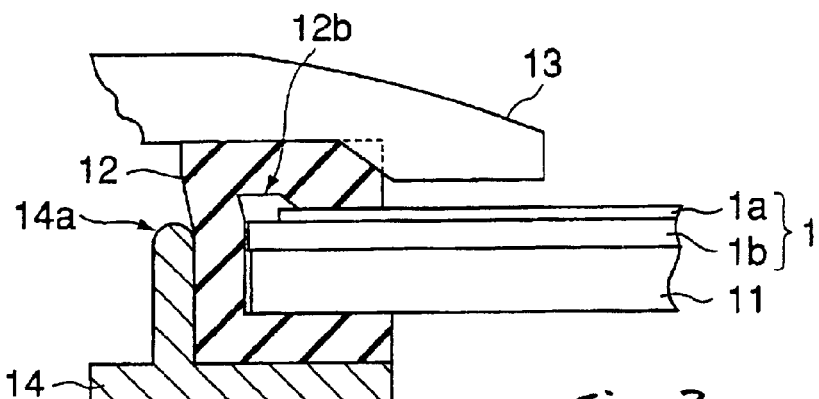
FIG. 2 is a cross-sectional view showing in detail a constitution example of assembly in mounting the touch panel on an information terminal device according to a first embodiment.

In this constitution, the touch panel 1 is disposed on a liquid crystal display (LCD) 11. A driving circuit is mounted on the rear surface of the liquid crystal display 11. The touch panel 1 and the LCD 11 are surrounded by a gasket 12 to be described later, which has elasticity so as to serve as a buffer member and has a frame shape with a hook-shaped cross-section. The gasket 12 is supported by a metal frame 14 and fixed in a manner of being held to a housing 13. FIG. 2 shows a cross-sectional constitution of the enlarged state where the gasket 12 is fixed to the housing 13.

An end portion of a film 1a included in the touch panel 1 is cut so as not to extend to an end surface of a touch panel substrate 1b. This arrangement is provided as a "relief" such that, even if the touch panel is pressed from its end surface side, the touch panel is not to be pressed from an end face of the film.

The gasket 12 is formed of a member, which has elasticity and heat resistance, does not easily deteriorate, and is transformed without difficulty. The gasket 12 may be constructed from many different types of materials. Preferably, the gasket 12 is constructed from rubber such as silicone rubber etc. On the inner side of the housing, a sloping portion 13a in FIG. 3A is provided so that a corner portion of the gasket 12 is contacted thereto.

Figures 3A, 3B:
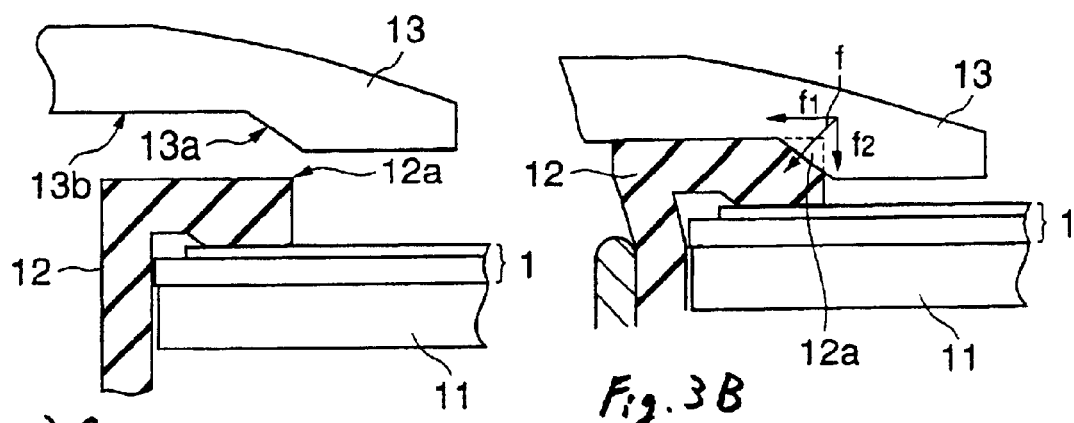
FIGS. 3A, 3B, 3C are views for explaining tension generated by a gasket in assembly according to a first embodiment.
Figure 3C:
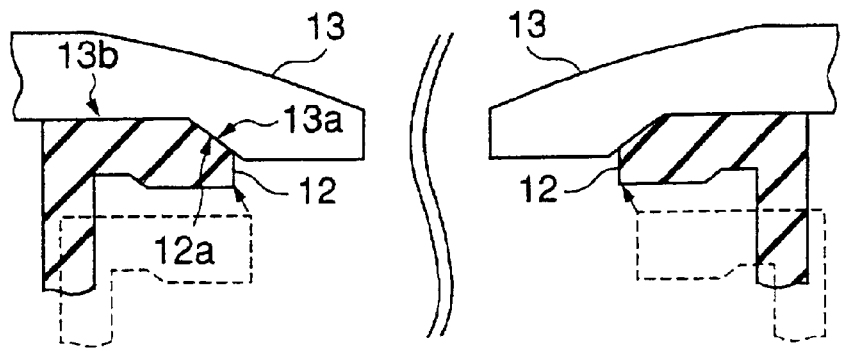

With reference to FIGS. 3A, 3B and 3C, the generation of pushing force to the end surface side (outward) of the touch panel through the gasket 12 in assembly will be described.

FIG. 3A shows a state of the gasket 12 before it is assembled to the housing 13 by enlarging FIG. 2. Assume that the touch panel 1 is to be pressed to the housing 13. As shown in FIG. 3B, when the metal frame 14 is pressed to the housing 13, an inside corner 12a of the gasket 12 comes into contact with the sloping portion 13a located at the inside of the housing. When the metal frame 14 is further pressed to the housing 13, the inside corner 12a is indented through the sloping portion 13a and transformed in a manner that the corner is extruded outward. That is, when the gasket 12 is pressed to the housing 13, force f in a diagonal direction (force f1 in a horizontal direction, force f2 in a vertical direction) is applied from the sloping portion 13a to the inside corner 12a. The force (tension) f1 of the force f in a horizontal direction affects the film 1a of the touch panel 1 to be drawn outward. The force f2 in a vertical direction affects the film 1a to be held so as to fix the touch panel 1, and further acts so as to prevent moisture or dust from coming into the device.

An upper portion 14a of the frame 14 is formed low so as not to come into contact with the housing 13 in assembly. By providing a portion which is not supported by the frame 14, the gasket 12 can be transformed easily when it is extruded outward. Note that a counterbore portion is provided at an inner side corner portion 12b of the gasket 12 so that the gasket 12 is formed so as not to contact with the end portion of the film 1a included in the touch panel 1.

When the gasket 12 is assembled to the housing 13, it may be considered that a dislocation in a positional relationship occurs owing to an error etc. and thus the inside corner 12a does not come into contact with the optimal portion of the sloping portion 13a. To deal with this case, as shown in FIG. 3C, the inside corner 12a moves along the sloping portion 13a until an upper surface of the gasket 12 comes into contact with a inside flat portion 13b of the housing 13 so that the positional relationship is corrected. By this correction, even when the positional relationship in assembly is not accurate one, the gasket is adjusted so as to hold the entire periphery of the touch panel 1 uniformly.

According to the constitution described in the first embodiment, the tension to draw outward is applied to the film 1a of the touch panel 1. Therefore, swelling or corrugation can be prevented from occurring in the film. In addition, it is possible to prevent moisture or dust from coming into the device, and further possible to relieve an impact applied from the outside so as to prevent the device from being damaged. Furthermore, even there is a dislocation in a positional relationship in assembly, the gasket guides the touch panel to the proper position so that the entire periphery of the touch panel can be hold uniformly.

When the touch panel is fixed to the housing 13 by means of the metal frame 14, the inside corner 12a of the gasket 12 is pressed against the sloping portion 13a of the housing 13 and thus transformed to be indented. This is because that some crushing is required to prevent water or dust from coming in. The effects of the crushing on swelling or corrugation in the film 1a of the touch panel 1 will be described. With reference to Table 2, deformation (the degree of crushing) of the gasket in assembling of the touch panel will be described. Table 2 shows an example of measurement results in a state where the touch panel is fixed in accordance with the structure described in the embodiment. That is, in assembling the touch panel to a device, it is assumed that the crushing degrees of the pressed inside corner 12a of the gasket 12 are 0.2, 0.4, 0.6 and 0.8 mm. Table 2 shows the results obtained by measuring the degree of swelling in the film 1a immediately after the assembly and the degree of swelling in the film 1a to which the acceleration test (for example, leaving the touch panel for twelve hours under the condition of the temperature of 70° C. and 85% of humidity in the atmosphere) is carried out after the assembly, respectively. TABLE 2 also shows the measurement result after carrying out the acceleration test to a touch panel having a conventional structure for the comparison.

TABLE 2

Swelling (mm) of Panel assembly in the Structure of the Present Invention

| Degree of crush | Degree of swelling (mm) (at the most swelled part) | | | |
| --- | --- | --- | --- | --- |
| | 0.2 | 0.4 | 0.6 | 0.8 |
| Before the acceleration test | 0.161 | 0.192 | 0.279 | 0.225 |
| After the acceleration test | 0.144 | 0.176 | 0.169 | 0.177 |
| Change in swelling degree | 0.89 | 0.92 | 0.61 | 0.79 |

Swelling (mm) of Panel assembly in the Conventional Structure

| Degree of crush | Degree of swelling (mm) (at the most swelled part) | | |
| --- | --- | --- | --- |
| | 0 | 0.2 | 0.4 |
| Before the acceleration test | 0.189 | 0.16 | 0.158 |
| After the acceleration test | 0.219 | 0.278 | 0.305 |
| Change in swelling degree | 1.16 | 1.74 | 1.93 |

From the results in Table 2, in the structure according to the present invention, the degree of swelling after carrying out the acceleration test tends to decrease as compared to the degree of swelling immediately after the assembly. In addition, it is found that the degree of swelling in the film is seldom influenced by the degree of crushing. Consequently, with a method of mounting the touch panel in accordance with the mechanism described in the present embodiment, even pressure is applied to the gasket so as to prevent moisture or dust from coming into the touch panel, the effect can be obtained in that no swelling or corrugation occurs in the film of the touch panel.

Next, as a second embodiment, a mechanism to prevent the occurrence of swelling or corrugation in a film of a touch panel mounted on an information terminal device will be described. The present embodiment is an embodiment in which a gasket, which is transformed from the gasket 12 described in the aforementioned first embodiment, is used.

Figure 5A:
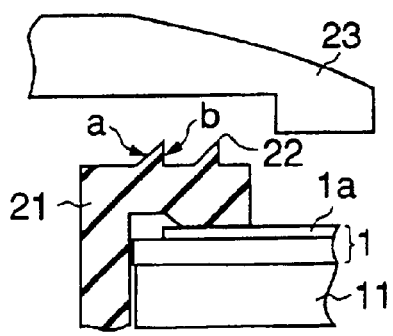
FIGS. 5A, 5B are cross-sectional views in detail showing a constitution example of assembly in mounting the touch panel on an information terminal device according to a second embodiment.
Figure 5B:
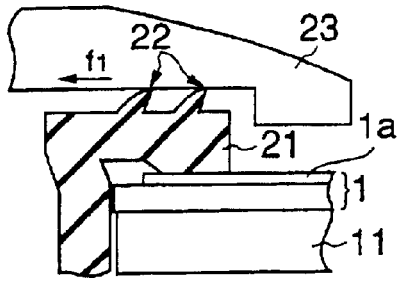

FIGS. 5A, 5B show cross-sectional constitution of the gasket. In the above-described first embodiment, the sloping portion is provided on the inner side of the housing 13. However, in this embodiment, such a sloping portion is not provided and tension to draw the touch panel outward through only the gasket.

As shown in FIG. 5A, on an upper surface of a gasket 21 having a hook shaped cross-section, wedge-shaped projecting portions 22 (22a, 22b), each lying around the gasket in a frame-like manner, are provided. These projecting portions 22 are formed such that their outsides are oblique sides (acute angles) a and the insides are vertical sides b. Note that the vertical sides b may be oblique sides which have an larger angle than one of the oblique sides a (obtuse angles) and the same inclination direction as one of the oblique sides a.

As shown in FIG. 5B, when the touch panel is assembled to the housing 23, tip portions of the projecting portions 22 come into contact with the inner upper surface of the housing 23. Being further pressed after contacting with the surface, the projecting portions 22 are transformed in a manner of being extruded outward, thereby force f1 to draw the upper portion of the gasket 21 in a horizontal direction outward occurs.

Therefore, tension f1 is applied to the film 1a of the touch panel 1 so that the film is drawn outward. Thus swelling or corrugation in the film can be prevented from occurring. In addition, it is possible to prevent moisture or dust from coming into the device, and further possible to relieve an impact applied from the outside so as to prevent the device from being damaged. Furthermore, the present embodiment can be carried out to the gasket only and thus can be applied easily to a conventional housing, which does not have a sloping portion. Therefore, the embodiment also has an effect on improvement of the conventional device.

Next, as a third embodiment, a mechanism to prevent the occurrence of swelling or corrugation in a film of a touch panel mounted on an information terminal will be described. Since the portable information terminal is an object to be described in the first and second embodiments, a gasket having a frame shape with a hook shaped cross-section is used therein while considering moderation of impact against a touch panel to be mounted on the terminal. However, in the present embodiment, a constitution is simple, considering waterproof and dustproof and regarding moderation of impact by means of a gasket has little importantanc.

Figure 6:
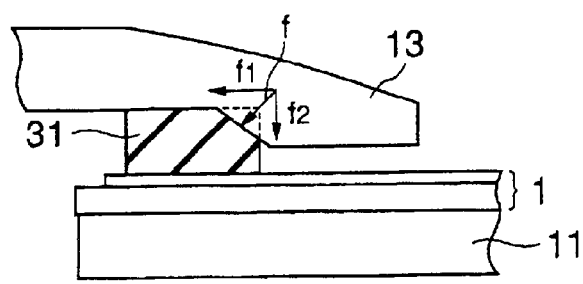
FIG. 6 is a cross-sectional view in detail showing a constitution example of assembly in mounting the touch panel on an information terminal device according to a third embodiment.

As shown in FIG. 6, the touch panel 1 disposed on the liquid crystal display (LCD) 11 is supported by a metal frame (not shown) with a frame-like gasket 31 intervened between the housing 13 and the touch panel. The gasket 31 makes goes around the perimeter of the panel. The touch panel 1 is fixed in a manner of being pressed to the housing 13.

When the gasket 31 is pressed by the housing 13, force f is applied from the sloping portion 13a to the inside corner 12a in the same manner as one in the first embodiment. The force (tension)f1 of the force f in a horizontal direction affects the film 1a of the touch panel 1 to be drawn outward. The force f2 of the force f in a vertical direction affects the film 1a to be held so as to fix the touch panel 1, and further acts so as to prevent water or dust from coming into the device. According to the embodiment, with a simple constitution, it is possible to prevent the occurrence of swelling or corrugation of the film, and prevent water or dust from coming in.

Next, as another embodiment, a mechanism to prevent the occurrence of swelling or corrugation in a film of a touch panel mounted on an information terminal will be described. Similarly to the above-described third embodiment, a constitution in the fourth embodiment is simple, considering waterproof and dustproof and regarding moderation of impact by means of a gasket has little importantance.

Figure 7A:
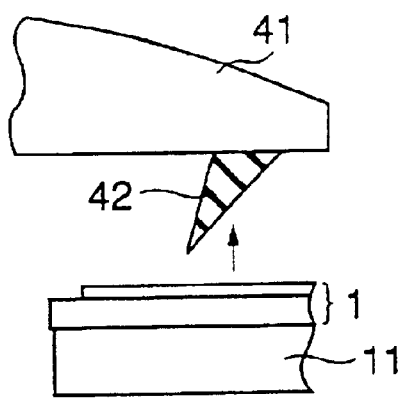
FIGS. 7A, 7B are cross-sectional views in detail showing a constitution example of assembly in mounting the touch panel on an information terminal device according to a fourth embodiment.
Figure 7B:
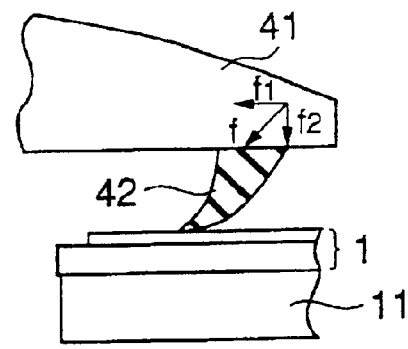

As shown in FIGS. 7A, 7B, a frame-like gasket 42 having a wedge-shaped cross-section is mounted on an inner surface of an housing 41. The gasket 42 is formed of rubber or sponge using the same material as one in the aforementioned gasket 12. Using elastomer etc. as a material, the gasket can also be formed while integrating with the housing 41. The touch panel 1 is supported by a metal frame (not shown) together with the LCD 11 and fixed in a manner of being pressed to the housing 41. In this case, after contacting of a tip portion of the gasket 42 with the film 1a, if the gasket 41 is further pressed to the film, it is transformed in a manner of being folded outward. Owing to this deformation, tension f1 acting to draw the film 1a outward occurs.

According to the present embodiment, with a simple constitution, it is possible to generate the tension f1 so as to prevent swelling or corrugation of the film from occurring, and further possible to prevent water or dust from coming in.

Figure 8A:
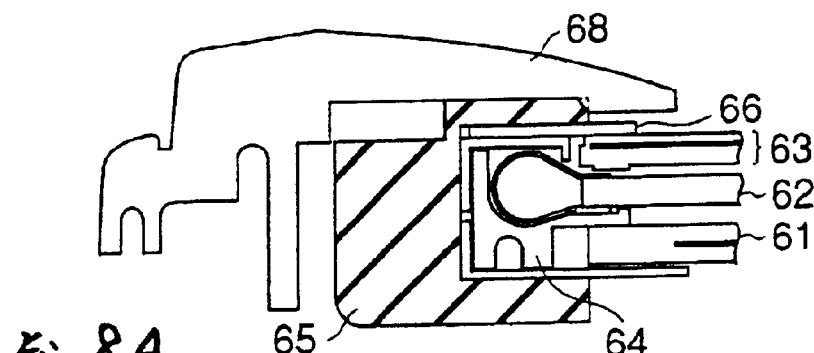
FIGS. 8A, 8B are cross-sectional views in detail showing a constitution example of assembly in mounting the touch panel on an information terminal device according to a fifth embodiment.
Figure 8B:
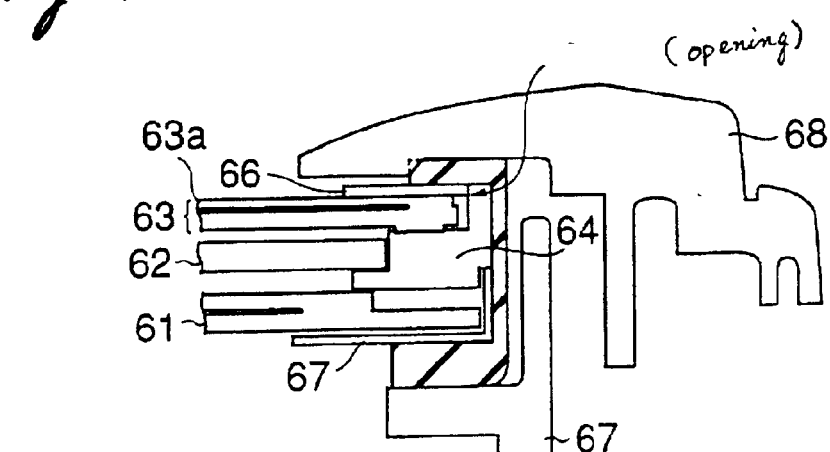

Next, as a fifth embodiment, a constitutional example of a mechanism, which prevents swelling or corrugation from occurring in a film of a touch panel included in an information input display device mounted on an information terminal, will be shown in FIGS. 8A,8B and described.

In this constitution, a display device shown in FIGS. 8A and 8B is constituted by: a liquid crystal display elements 61; light guide 62; a touch panel 63 wherein input operation is executed by contact (pressure); a supporting section 64 which supports the liquid crystal display elements 61, light guide 62, and touch panel 63 in a integrated manner; a frame-like gasket 65 having a hook shaped cross-section, which interfits the above incorporated members around; and a sheet 66, which is inserted between the touch panel 63 and gasket 65 when the gasket 65 interfits the incorporated members. The incorporated members are fixed to a housing 68 by means of a metal frame 67.

As shown in FIG. 8A, in a case where lighting etc. is arranged at an end portion of the light guide 62, portions covered by the gasket 65 may not be sufficient to cover the touch panel. As a result, tension through the gasket 65 may have no affect. In addition, as shown in FIG. 8B, in a case where an opening exists between the touch panel 63 and supporting section 64, even if the opening exists slightly, the gasket 65 may not come into contact with the touch panel 63 sufficiently. As a result, water and dust can easily penetrate.

So, in the present embodiment, the sheet 66 is adhered to the touch panel 63 so as to eliminate the opening between the supporting section 64 and the touch panel 63. In addition, the sheet 66 is adhered to a film 63a so as to cause tension generated in the gasket 65 to affect the film 63a sufficiently. Note that the sheet 66 can be formed of, for example, a resin material such as polyethylene terephthalate (PET) etc. However, it is not limited to that material. In the embodiment, it has been ascertained that sufficient tension is transmitted from the gasket 65 to the film 63a while using a sheet having about 0.3 mm of its thickness for the sheet 66.

Consequently, according to the embodiment, the device is arranged such that a sheet is intervened between the touch panel and the gasket so as to enhance adhesion, with the result that generated tension is affected sufficiently. Thus, it is possible to prevent swelling or corrugation of the film from occurring, and further possible to prevent water or dust from coming in the device.

As having been described in detail above, according to the present invention, it is possible to provide an information input display device, which has a mechanism to perform a process of suppressing the occurrence of swelling or corrugation of a film included in an input section which is disposed on a display such as a liquid crystal display etc., and also has a mechanism to prevent swelling or corrugation from occurring in the case where the device is incorporated and fixed.

What is claimed is:

1. An information input display device, comprising:
   a display section that indicates information;
   an input section arranged on a surface of the display section and capable of displaying the information in a transmittable manner, the input section comprises: a base material capable of displaying in a transmittable mariner; a film capable of displaying in a transmittable maimer; mid an adhesive to adhere a surrounding portion of the film to the base material on which the film is superposed; and
   a casing that contains the display section and the input section, the casing comprises a drawing action section that applies a tension to the film directly or indirectly, the drawing action section comprises at least one of a sloped portion of the casing and a wedge-shaped projection mounted upon the casing.

2. The device according to claim 1, comprising an elastic member to come into contact with at least the surrounding portion of the input section, the drawing action section applies tension through the elastic member in a manner of drawing the film in a horizontal outward direction.

3. The device according to claim 1, the sloped portion of the casing contacts a corner of a gasket, such that the gasket draws the film in a horizontal outward direction.

4. The device according to claim 1, the wedge-shaped projection folds outwards upon contacting the film and draws the film in a horizontal outward direction.

5. The device according to claim 2, the elastic member comprises a projection, which comes into contact with the drawing action section.

6. An information input display device, comprising:
   a display section to indicate information;
   an input section arranged on a surface of the display section and capable of displaying the information in a transmittable manner, the input section comprises a base material that displays in a transmittable manner, a film that displays in a transmittable manner; and an adhesives that adheres a perimeter portion of the film to the base material on which the film is superposed;
   an elastic member that surrounds an entire aide portion of the input section and the display section;
   a casing that contains the display section and the input section, the casing comprises a drawing action section that applies a tension to the film directly or indirectly, the drawing action section comprises at least one of sloped portion of the casing, a wedge-shaped projection mounted upon the casing, and a section of the casing that interacts with wedge-shaped projection, positioned upon the elastic member; and
   a frame member that protects a perimeter of the display section and the input section through the elastic member and supports the display section and the input section by connecting with the casing.

7. The device according to claim 6, the sloped portion of the casing contacts a corner of the elastic member, which in turn contacts the film so as to draw the film in a horizontal outward direction.

8. The device according to claim 6, the wedge-shaped projection folds outwards and causes of the elastic member to come into contact with the film so as to draw the film in a horizontal outward direction.

9. The device according to claim 6, the frame member is arranged in that a supporting portion of the frame member has a height shorter than the thickness of display section and the input section, so that the frame member does not come into contact with the elastic member at least at a contacting surface of the casing.

10. The device according to claim 6, the wedge-shaped projections positioned upon the elastic member contact the drawing action section and yield a force upon the film directed in the outwards horizontal direction.

* * * * *